United States Patent [19]

Bergevin et al.

[11] 3,722,174
[45] Mar. 27, 1973

[54] PACKAGING OF LIQUID-FILLED FLEXIBLE POUCHES IN THERMOPLASTIC BAGS

[75] Inventors: Jean Paul Bergevin, Kingston, Ontario; Karl Otto Kuester, Collins Bay, Ontario, both of Canada

[73] Assignee: Du Pont of Canada, Limited, Montreal, P.Q., Canada

[22] Filed: May 18, 1971

[21] Appl. No.: 144,430

[30] Foreign Application Priority Data

June 19, 1970 Canada..................................86,071

[52] U.S. Cl.......................................53/182, 53/183
[51] Int. Cl. ..............................................B65b 9/08
[58] Field of Search.....................53/28, 29, 182, 183

[56] References Cited

UNITED STATES PATENTS 2,943,429   7/1960   Van Vactor et al.....................53/182
3,501,887   3/1970   Umholtz et al. .....................53/182 X
3,161,001   12/1964  Grevich et al. ..........................53/182
3,543,467   12/1970  Leasure...................................53/28

Primary Examiner—Travis S. McGehee
Attorney—Louis Del Vecchio

[57] ABSTRACT

A process and apparatus for continuously packaging liquid-filled flexible pouches in thermoplastic bags by:
  a. spreading a folded thermoplastic film over a pouch-receiving box wherein the fold forms the bottom of the bag;
  b. heat-sealing the leading edges of the film to each other beneath the pouch-receiving box forming one closed side of the bag;
  c. placing two or more liquid-filled packages in the pouch-receiving box;
  d. heat-sealing the trailing edges of the film to each other over the pouch-receiving box forming another closed side of the bag; and
  e. discharging the bag having one end open and containing the liquid-filled pouches.

2 Claims, 4 Drawing Figures

INVENTORS
JEAN PAUL BERGEVIN
KARL OTTO KUESTER
BY James De Vecchio
ATTORNEY

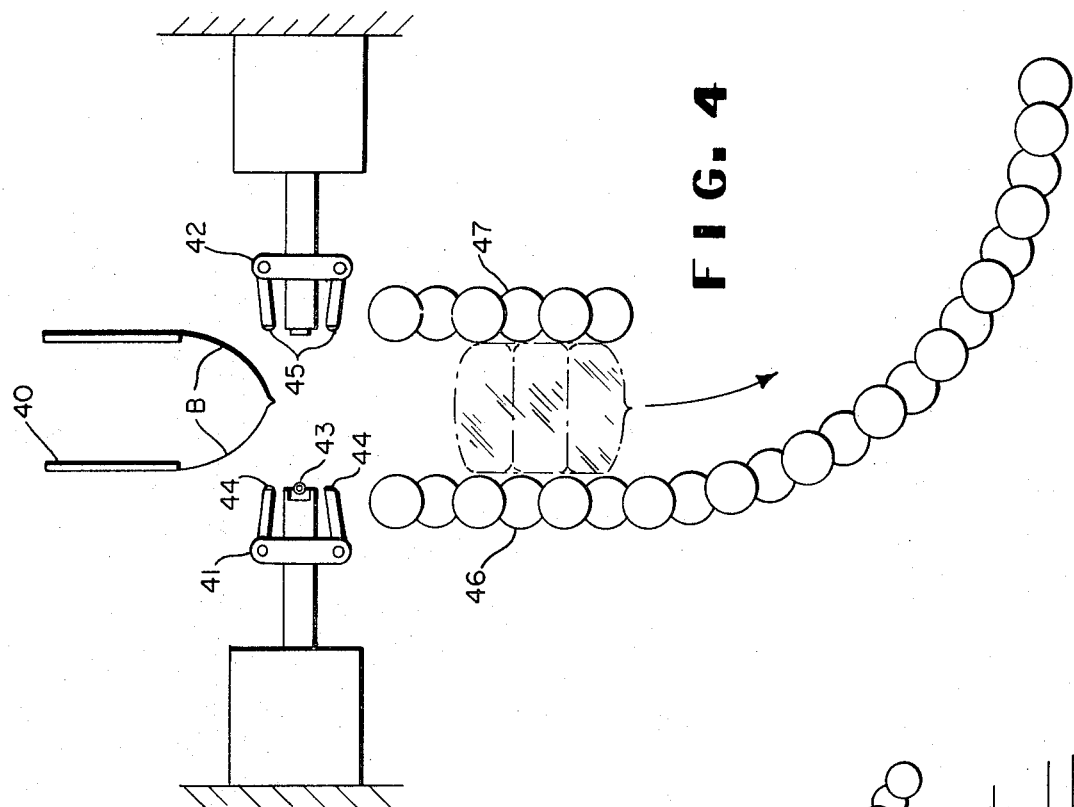
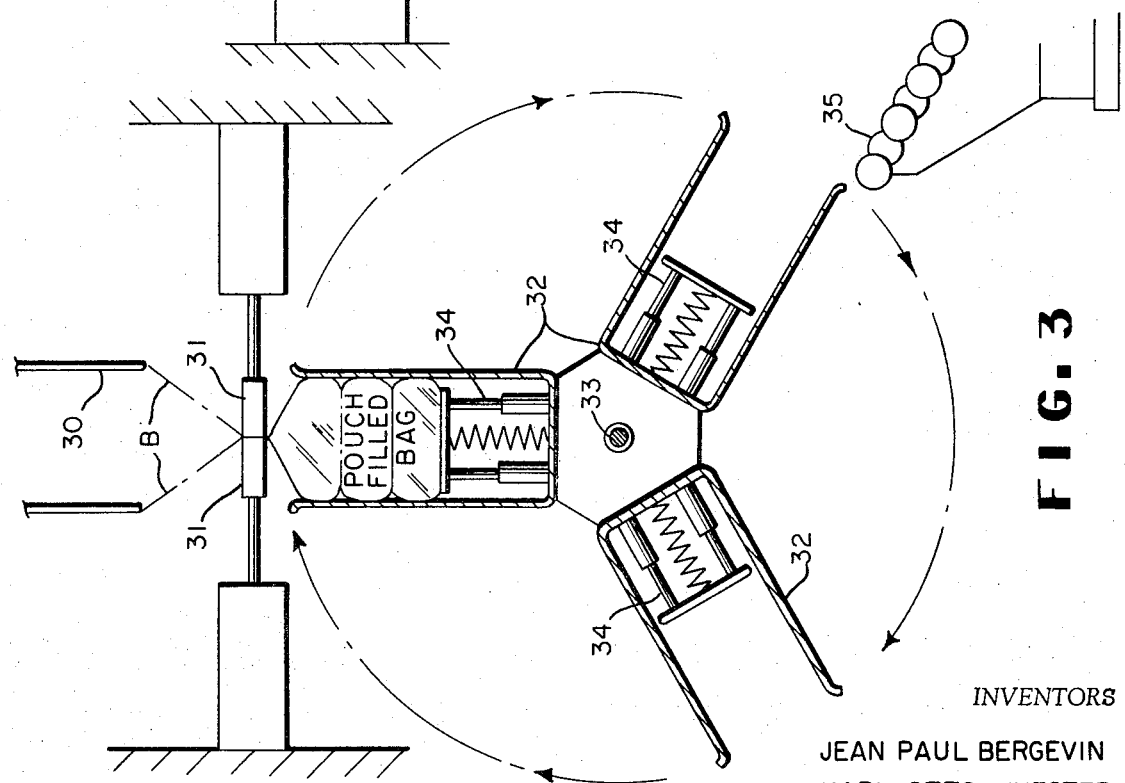

PACKAGING OF LIQUID-FILLED FLEXIBLE POUCHES IN THERMOPLASTIC BAGS

BACKGROUND OF THE INVENTION

This invention relates to a process and apparatus for packaging liquid-filled flexible pouches in bags made of thermoplastic film.

It is well known to package liquids, for example, milk, in thermoplastic film pouches using a so-called "-vertical form-and-fill machine." For effective marketing of milk, the pouches (normally quart size) are usually packaged in threes in an outer plastic bag. When packaging ethylene glycol antifreeze, it is often desirable to package four one-quart pouches in each outer plastic bag to provide one gallon per bag.

Up to the present time, the placing of the pouches in the outer plastic bags has been done manually at an appreciable cost for labor. Therefore, it is desirable to find an automatic and continuous process and apparatus for packaging liquid-filled pouches in plastic bags.

SUMMARY OF THE INVENTION

Accordingly, the present invention provides a process and apparatus for continuously packaging liquid-filled flexible pouches in bags made of thermoplastic film comprising the steps of feeding a continuous, folded web of thermoplastic film into a packaging zone, the web being folded substantially along its longitudinal axis to form two layers of film joined along the longitudinal fold at one side and open at the other side, the longitudinal fold becoming the bottom of the bag when completed, spreading the two layers of film over a pouch-receiving box in the packaging zone, bringing together and transversely heat-sealing the leading edges of the two layers of film beneath the receiving box to form the first side of a bag, conveying in succession at least two liquid-filled pouches into the receiving box through the open side of the two layers of film, stacking the pouches in the receiving box one on top of the other, advancing the folded web a predetermined distance, bringing together, transversely heat-sealing and cutting through the two layers of film trailing the pouches so stacked thus completing the other side of the bag and simultaneously forming a first side of another bag, and discharging the bag which is still open at the top but contains the filled pouches.

The apparatus of the present invention continuously packages at least two liquid-filled flexible pouches in bags made of thermoplastic film and comprises in combination:

a. a supply roll adapted to support a continuous, folded web of thermoplastic film, the web being folded substantially along its longitudinal axis to form two layers of film joined along the longitudinal fold at one side and open at the other side, the longitudinal fold becoming the bottom of the bag when completed;

b. a packaging zone;

c. a pouch-receiving box within the packaging zone;

d. two feed rolls adapted to draw intermittently the folded web from the supply roll and to spread the two layers of film therein over the pouch-receiving box;

e. a conveying means adapted to receive in succession the liquid-filled flexible pouches from a source of supply and to stack them one above the other in the pouch-receiving box;

f. a pair of jaws below the receiving box adapted to bring together, transversely heat-seal and cut through the two layers of film to form simultaneously an upper side of one bag and a lower side of another bag;

g. support means adapted to support a partially formed bag containing the pouches while the upper side of the bag is being formed; and h. discharge means below the sealing jaws.

BRIEF DESCRIPTION OF THE DRAWINGS

Embodiments of the present invention are illustrated in the accompanying drawings wherein:

FIG. 3 is a schematic representation of an alternative bag-supporting and discharge means.

FIG. 4 is a schematic representation of another alternative bag-supporting and discharge means.

DETAILED DESCRIPTION OF THE INVENTION

Figure 1:
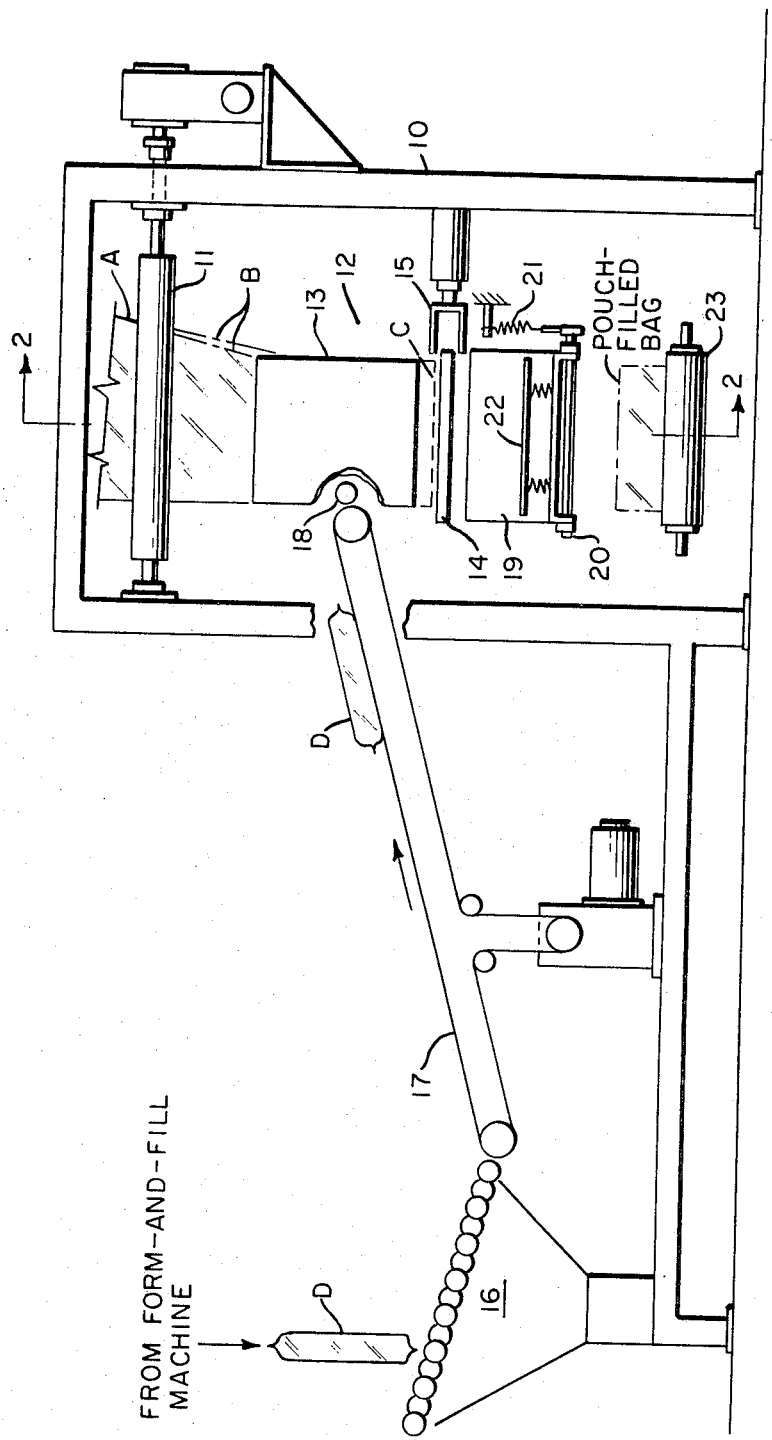
FIG. 1 is an end elevation of an embodiment of the invention partially in section.
Figure 2:
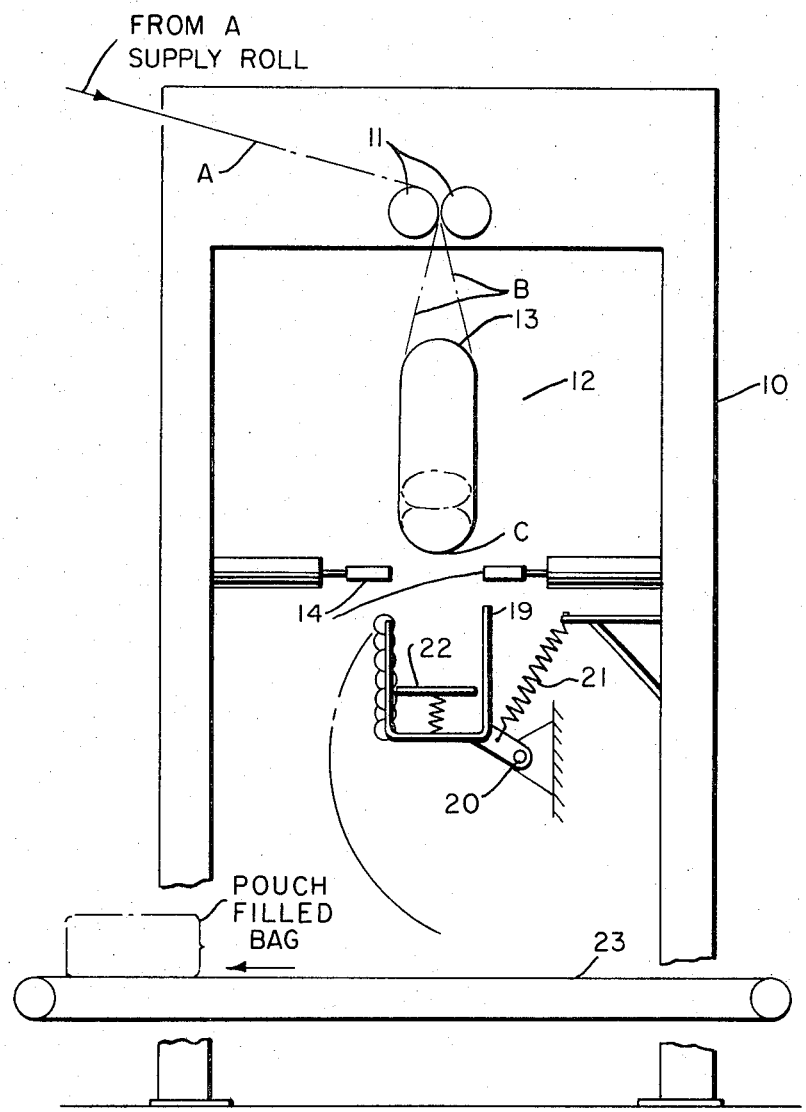
FIG. 2 is a section of FIG. 1, viewed in the direction of the arrows 2—2 in FIG. 1 (with the gusseting device omitted).

In FIGS. 1 and 2 of the drawings, a frame 10 supports the apparatus. Thermoplastic film (either flat or folded) from a supply roll (not shown) is drawn intermittently by two feed rolls 11 and advanced as a continuous folded web A into a packaging zone 12. The web A is folded substantially along its longitudinal axis to form two layers of film B joined along the longitudinal fold at one side and open at the other side. The feed rolls 11 also spread the two layers of film B over a pouch-receiving box 13 in the packaging zone 12. The pouch-receiving box 13 is open at the front and bottom. A pair of jaws 14, below the receiving box 13, is adapted to bring together, transversely heat-seal and cut through the two layers of film. One heat-seal which forms the lower side of the bag is indicated by C. While the two layers of film are being brought together by the jaws 14, a gusseting device 15 tucks in the longitudinal fold joining the two layers of film at points immediately above and below the jaws 14 to form gussets. In FIG. 1, a declined roller section 16 formed from wheels arranged in staggered relationship and a rough-surfaced belt conveyor 17 cooperate to receive in succession liquid-filled pouches D from a form-and-fill machine and to stack them one above the other in the pouch-receiving box 13. A row of rotatable wheels 18 inside the pouch-receiving box and just ahead of the belt conveyor 27 guide the pouches into the receiving box 13. Heat-seal C in the lower side of the bag supports the pouches D inside the receiving box 13. When the desired number of pouches (usually two, three or four, but maybe more depending among other things on the strength of the thermoplastic film) are stacked in the receiving box 13, the feed rolls 11 advance web A a preset distance. The steps described above of bringing together, heat-sealing and cutting through the two layers of film and forming the gussets are then repeated to complete one bag (open at the top) and to form the lower side of another bag. A discharge chute 19 below jaws 14 is pivotably mounted by pin 20. Discharge chute 19 is pivoted from a bag-receiving position to a bag-discharge position by the weight of the complete (but open) bag. Spring 21 urges discharge chute 19 back to a bag-receiving position. A spring supported platform 22 in discharge chute 19 is adapted to move vertically up and down when the discharge chute 19 is in the bag-receiving position to support the lower side of each bag immediately prior to and during the closing of jaws 14 to complete the bag.

To commence operation, the feed rolls 11 advance the folded web A a preset distance and spread the two layers of film B contained therein over the pouch-receiving box 13. Jaws 14 bring together the two layers of film B. While the jaws 14 are closing, the gusseting device 15 produces gussets in the longitudinal fold above and below the jaws 14. When the jaws are closed, an electrical impulse sealer in one of the jaws (not shown) cuts through the two layers of film B and seals the two layers together above and below the cut-off line. The electrical impulse sealer may be of solid wire or it may be made of hollow wire and have a cooling fluid such as air passing through it. The seal C above the cut-off line forms the lower side of a bag and the longitudinal fold with the gusset, adjacent to said lower side, forms the bottom of the bag.

The declined roller section 16 and the belt conveyor 17 cooperate to receive the pouches D from a form-and-fill machine and to stack them one above the other in the pouch-receiving box 13, where they are supported by the heat-seal C. It will be appreciated that pouches may be received from two form-and-fill machines or from any suitable source of supply. When the desired number of pouches are stacked in the receiving box 13, the feed rolls 11 advance web A a preset distance. When web A is advanced, the pouches supported by heat-seal C descend between the open jaws 14 into the discharge chute 19, where they rest on the spring-supported platform 22. Jaws 14 again bring together the two layers of film B; the gusseting device 15 again produces gussets; the electrical impulse sealer in one of the jaws again cuts through the two layers of film B and seals the two layers together above and below the cut-off line. While the jaws 14 are still closed, a new series of pouches begin accumulating in the receiving box 13. When the cut-off occurs, the weight of the pouch-filled (but open) bag causes the discharge chute 19 to pivot on pin 20 and to discharge the bag to conveyor 23. Spring 21 returns the discharge chute 19 to the bag-receiving position as soon as the bag is discharged. Feed rolls 11 again advance the web A a preset distance and the above procedure is repeated to produce continuously, pouch-filled bags which are open at the top. Conveyor 22 may be used to transport the bags to a twist-tie or other closing device.

FIG. 3 shows a portion of another embodiment of the invention in which different bag-supporting and discharge means are employed. In FIG. 3, the bottom portion of a discharge chute is indicated by the numeral 30. Jaws 31 below the receiving box 30 are shown in a closed position. Three discharge chutes 32 are mounted radially at 120 degrees to each other about an axis below the jaws 31 and pin 33. The discharge chutes 32 are adapted to rotate on pin 33 in a substantially vertical plane such that when one discharge chute moves 120 degrees from a vertical bag-receiving position to a bag-discharging position another discharge chute moves from a waiting position to a bag-receiving position. Three spring-supported platforms 34 are mounted, one in each of the three discharge chutes 32. Each platform is adapted to move vertically up and down when its discharge chute is in the bag-receiving position to support a partially formed bag immediately prior to and during the closing of the jaws 31 to complete the bag. Declined roller section 35 receives the complete (but open-topped) bags in turn from the discharge chutes.

In operation, each time an electrical impulse sealer (not shown) in one of the sealing jaws 31 cuts through the two layers of film B and seals the two layers together above and below the cut-off line, a pouch-filled (but open-topped) bag is released into one of the three discharge chutes 32. The full weight of the pouch-filled bag further depresses the spring-supported platform 34 which lowers the upper side of the bag below the jaws 31. The discharge chutes 32 are then rotated 120 degrees on pin 33. This rotation discharges the complete (but open-topped) bag from the one discharge chute onto declined roller section 35 and brings another discharge chute into a bag-receiving position below the sealing jaws 31.

FIG. 4 shows a portion of yet another embodiment of the invention in which still different bag-supporting and discharge means are employed. In FIG. 4, the bottom portion of a discharge chute is indicated by the numeral 40. Jaws 41 and 42 below the receiving box are shown in an open position. An electrical impulse sealer 43 is mounted in jaw 41. Impulse sealer 43 may be of solid wire or it may be of hollow wire and have a cooling fluid such as air passing through it. Two articulated lips 44 are mounted on jaw 41 above and below impulse sealer 43 and two articulated lips 45 are mounted on jaw 42 opposite the lips on jaw 41. The lips 44 on jaw 41 and the lips 45 on jaw 42 are adapted to cooperate when the jaws are closed to grip the two layers of film B above and below the electrical impulse sealer 43 to support a partially formed bag during the heat-sealing and severing operation. Arcuated roller section 46 and roller section 47 below the jaws 41 and 42 are adapted to discharge the complete (but open-topped) bag after the sealing jaws are opened.

In operation, each time the sealing jaws 41 and 42 are closed, the articulated lips 44 and 45 cooperate to grip the two layers of film B above and below the electrical impulse sealer to support the partially completed pouch-filled bag. Electrical impulse sealer 43 then cuts through the two layers of film B and seals the two layers together above and below the cut-off line. Sealing jaws 41 and 42 are then opened and a complete (but open-topped) pouch-filled bag is discharged by roller sections 46 and 47.

For operation at rates above about 10 to 15 pouch-filled bags per minute, it is advantageous to install a pair of horizontal swing gates in the pouch-receiving box (see FIG. 1). In the closed position, these swing gates, which may be located just below the row of rotatable wheels 18, support momentarily the first pouch for each bag and thus allow the jaws adequate time to open and close. The gates may be adapted to close as the first pouch approaches the receiving box 13 and to open as the second pouch approaches the receiving box 13.

Liquid-filled pouches which are firm or those which are loose and flexible may be packaged satisfactorily according to the present invention.

Various thicknesses of thermoplastic film may be used in packaging liquid-filled pouches according to the present invention. However, the preferred thickness of the film is in the range of 1.5 mils (0.015 inch) to 2.5 mils (0.025 inch). The thermoplastic film may be of any type that is capable of being simultaneously sealed and cut through by an electrical impulse sealer. A list of suitable materials would include films of:

conventional and linear polyethylene,
blends of polyethylene and elastomers,
blends of polypropylene,
ethylene/vinyl acetate copolymers,
copolymers or ethylene and other α-olefins,
polyvinyl chloride, and
laminated film structures.

When packaging three one-quart pouches in each bag, packaging rates in the range of from 10 to 27 bags per minute have been achieved. The highest rate corresponds to the output from two form-and-fill machines, each operating at 40 pouches per minute.

The following example illustrates the present invention without limiting its scope.

EXAMPLE

Milk was being packaged in 1-quart thermoplastic pouches on two form-and-fill machines; each machine was producing 30 pouches per minute. The total of 60 pouches per minute was packaged in thermoplastic film bags (three pouches per bag for a total of 20 bags per minute) using the embodiment of the invention as indicated in FIGS. 1 and 2 except that the bag-supporting and discharge means of FIG. 4 were provided and a pair of swing gates was installed in the pouch-receiving box.

The continuous, folded web of thermoplastic film used for the bags was 2-mil (0.002 inch) thick polyethylene. The film had printed marks on it corresponding to the required width for each bag.

Each of the two form-and-fill machines discharged its pouches to a separate declined roller section and each declined roller section discharged its pouches at separate points on a rough-surfaced rubber belt conveyor, which conveyed the pouches in turn to the pouch-receiving box.

As each pouch approached the receiving box, it was witnessed by a photo-electric cell which activated a counting relay. As the first pouch approached the receiving box, the counting relay caused the pair of swing gates inside the receiving box to close and support the pouch. At the approach of the second pouch, the swing gates were caused to open so that the first and then the second pouches were supported between the two layers of film by a transverse seal therein. The approach of the third pouch triggered the film feed rolls. The film was pulled under light tension from the supply roll (to avoid excessive drag or backlash) until a printed mark on the film was witnessed by a second photo-electric detector. Instantaneously, the feed rolls were braked to a stop and the jaws began to close. As the film was advanced, the three pouches in the semi-finished bag descended between the jaws to between the roller sections beneath the jaws. While the jaws were closing, a gusseting device produced gussets in the longitudinal fold above and below the jaws. When the jaws were completely closed, the articulated lips on the jaws cooperated to grip the two layers of film to support the pouches in the semi-finished bag. A sealing cycle was initiated by limit switches actuated when the jaws were closed. In the sealing cycle, a pulse of electric current (through an impulse sealer of hollow wire having air blown through it) was followed by a brief cooling period with the jaws closed. Meanwhile, one pouch of the next series had arrived on the closed gates in the pouch-receiving box. When the sealing cycle was complete, the jaws were opened to release the completed (but open-topped) bag between the roller sections and also to release the semi-finished bag above the jaws.

The above procedure was then repeated to produce the pouch-filled bags at the rate of 20 per minute. The completed (but open-topped) bags were transported by conveyor to a twist-tie closing device.

We claim:

1. An apparatus for continuously packaging at least two liquid-filled flexible pouches in bags made of thermoplastic film comprising in combination:

a. a supply roll adapted to support a continuous, folded web of thermoplastic film, the web being folded substantially along its longitudinal axis to form two layers of film joined along the longitudinal fold at one side and open at the other side, the longitudinal fold becoming the bottom of the bag when completed;

b. a packaging zone;

c. a pouch-receiving box within the packaging zone;

d. two feed rolls adapted to draw intermittently the folded web from the supply roll and to spread the two layers of film therein over the pouch-receiving box;

e. a conveying means adapted to receive in succession the liquid-filled flexible pouches from a source of supply and to stack them one above the other in the pouch-receiving box;

f. a pair of jaws below the receiving box adapted to bring together, transversely heat-seal and cut through the two layers of film to form simultaneously an upper side of one bag and a lower side of another bag;

g. gusseting means adjacent the sealing jaws adapted to form two adjacent gussets, one each in the bottom of adjacent bags, while two layers of film are being brought together by the sealing jaws;

h. support means adapted to support a partially formed bag containing the pouches while the upper side of the bag is being formed wherein said support means is a spring-supported platform mounted in the discharge chute and adapted to move vertically up and down while the discharge chute is in the bag-receiving position to support the partially formed bag immediately prior to and during the closing of the jaws to complete the bag formation; and i. discharge means below the sealing jaws wherein the the discharge means is a discharge chute pivotally mounted below the jaws and adapted to pivot from a bag-receiving position to a bag-discharging position.

2. The apparatus of claim 1 wherein the discharge means comprise three discharge chutes mounted radially at 120° to each other about an axis below the jaws and adapted to rotate in a substantially vertical plane about the axis such that when one discharge chute moves 120° from a vertical bag-receiving position to a bag-discharging position, another discharge chute moves to a bag-receiving position and wherein the support means comprises a spring-supported platform mounted in each of the three discharge chutes, adapted to move vertically up and down while each discharge chute is in the bag-receiving position to support the partially formed bag immediately prior to and during the closing of the jaws to complete the bag.

* * * * *